J. C. POTTER.
POWER OPERATED LATHE CHUCK.
APPLICATION FILED MAY 23, 1914.
1,211,622.
Patented Jan. 9, 1917.
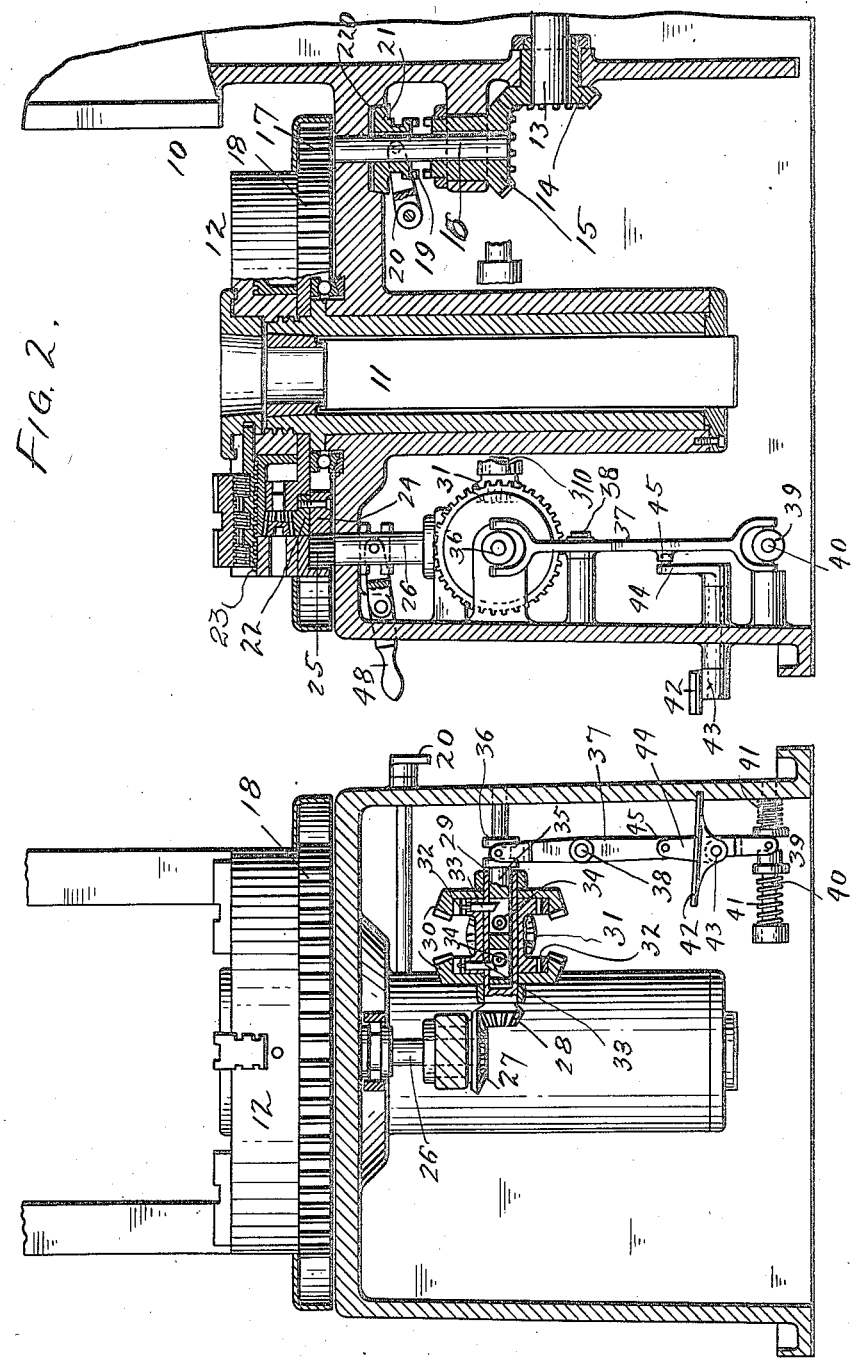
WITNESSES:
INVENTOR
James C. Potter,
BY
Chas. J. Williamson
ATTORNEY

UNITED STATES PATENT OFFICE.

JAMES C. POTTER, OF PAWTUCKET, RHODE ISLAND.

POWER-OPERATED LATHE-CHUCK.

1,211,622.

Specification of Letters Patent.

Patented Jan. 9, 1917.

Application filed May 23, 1914. Serial No. 840,569.

*To all whom it may concern:*

Be it known that I, JAMES C. POTTER, a citizen of the United States, of Pawtucket, in the county of Providence, and in the State of Rhode Island, have invented a certain new and useful Improvement in Power-Operated Lathe-Chucks, and do hereby declare that the following is a full, clear, and exact description thereof.

A lathe chuck is desirable which can be operated more quickly and powerfully than by hand. This has been done by compressed air, but that is objectionable because of the special and costly installation it requires. Springs and toggles have been proposed, but they are uncertain and weak in operation.

The object of my invention is to provide a power operated chuck which will be free from these objections, and entirely satisfactory as to quickness of operation.

In the annexed drawings—Figure 1 is a vertical section of a power chuck embodying my invention; Fig. 2 is a similar view on a plane at right angles to Fig. 1.

I show my invention, for illustrating one example thereof, embodied in an automatic turret lathe 10, in which the work spindle 11 revolves about a vertical axis, the chuck 12 (in itself of the well known scroll type) being mounted at the top of the spindle, and being driven from a shaft 13 connected with the driving shaft of the machine, the shaft 13 having a bevel gear 14 which meshes with a like gear 15 on the lower end of a vertical shaft 16 that at its upper end has a spur pinion 17 which meshes with a gear 18 secured to the chuck 12. The gear 15 is loose on the shaft 16, but may be clutched thereto by a sliding clutch 19 splined to the shaft and provided with a hand lever 20 for operating it. The clutch 19 has a cone 21 adapted to enter a conical recess 220 in the underside of a partition of the frame 10, to act as a brake to stop the chuck when the clutch is disengaged from the bevel gear 15.

Secured to the under side of the bevel gear 22 which revolves the jaw-operating scroll 23 is a spur gear 24 with which meshes a pinion 25 cut on the upper end of a vertical shaft 26. On the lower end of the shaft 26 is a feather keyed bevel gear 27 which meshes with a pinion 28 on the end of a horizontal shaft 29 upon which are mounted two oppositely arranged bevel gears 30 which are in mesh with a single driving bevel pinion 31 so that by said driving pinion the bevel gears revolve in opposite directions. The pinion 31 is on a shaft 310 which is revolved from the driving shaft of the machine. One bevel gear 30 at a time is adapted to be clutched to the shaft 29 by a friction clutch, the one shown being the familiar split ring type 32, the ring of which is adapted to be expanded by a radial pin 33 having a beveled inner end in the path of a roller 34 carried by a sliding rod 35 so that by the longitudinal movement of the rod in one direction, one clutch will be engaged with its bevel gear and the other released. Spaced collars 36 on the rod 35 are engaged by the yoked end of a lever 37 which has a pivot 38 intermediate its ends and at its lower end has a yoke that lies between opposing collars 39 slidable upon a rod 40. Each collar is acted upon by a spring 41 so adjusted that the two springs oppose each other and yieldingly maintain the clutch-operating rod 35 in a neutral position so that normally neither bevel gear 30 is clutched to the shaft 29. For rocking the clutch-operating lever 37 in either direction, I provide a double treadle 42 pivoted between its ends to a shaft 43 and having a radial arm 44 which extends upward from the pivot shaft 43, and is pivotally connected at 45 to the lever 37. The shaft 26 is vertically movable to place its pinion 25 in and out of mesh with the scroll operating gear, a hand lever 48 being provided for the purpose of so moving it.

Although connected with the driving shaft of the machine so that the limit of power may be applied to the chuck, yet, since that power is applied through a friction clutch interposed between the chuck and the driving shaft of the machine, it is possible to cause the chuck jaws to move gently upon the work and to vary the strength, or power of the grip simply by graduating the foot pressure upon the treadle. By reason of the independence of the clutches, the power applied in each case of closing and opening the jaws, may be just what the case requires. By the use of the treadle it will be seen that the workman has both hands available for handling the work in the chuck for the hand is not required in the chuck closing and opening operations.

It is to be understood that the particular construction shown in the drawings to illustrate my invention is simply one embodiment thereof as my invention is susceptible to embodiment in varied forms and with different mechanisms.

Having thus described my invention what I claim is—

1. The combination of the jaw-moving means of a chuck, a driven shaft operatively connected therewith, alternately acting oppositely rotating members on said shaft, a power driven machine shaft, a constantly acting operative connection between said driven shaft and said rotating members, and means for operatively connecting either of said rotating members at a time with said driven shaft.

2. The combination of the jaw-moving means of a chuck, a shaft parallel with and eccentric to the chuck axis and operatively connected with said jaw-moving means, a second shaft geared to said first mentioned shaft, a pair of bevel gears loose on said second named shaft, a driving shaft, a gear on the latter constantly meshing with said loose gears, and means to connect said loose gears alternately with their shaft.

In testimony that I claim the foregoing I have hereunto set my hand.

JAMES C. POTTER.

Witnesses:
MITCHELL ADAMS,
ELVERY LINGARD.